(12) United States Patent
Wu et al.

(10) Patent No.: US 12,147,113 B2
(45) Date of Patent: Nov. 19, 2024

(54) DISPLAY DEVICE AND VEHICLE MONITORING DEVICE

(71) Applicant: WUHAN CHINA STAR OPTOELECTRONICS TECHNOLOGY CO., LTD., Hubei (CN)

(72) Inventors: Teng Wu, Hubei (CN); Gengxiu Diao, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/618,480

(22) PCT Filed: Nov. 23, 2021

(86) PCT No.: PCT/CN2021/132501
§ 371 (c)(1),
(2) Date: Dec. 12, 2021

(87) PCT Pub. No.: WO2023/082327
PCT Pub. Date: May 19, 2023

(65) Prior Publication Data
US 2024/0012281 A1    Jan. 11, 2024

(30) Foreign Application Priority Data
Nov. 15, 2021  (CN) .......................... 202111348098.6

(51) Int. Cl.
*G02F 1/1335*     (2006.01)
*G02F 1/1339*     (2006.01)

(52) U.S. Cl.
CPC .. *G02F 1/133514* (2013.01); *G02F 1/133512* (2013.01); *G02F 1/1339* (2013.01)

(58) Field of Classification Search
CPC ......... G02F 1/133514; G02F 1/133512; G02F 1/1339
(Continued)

(56) References Cited

FOREIGN PATENT DOCUMENTS

| CN | 101447145 A | 6/2009 |
|----|-------------|--------|
| CN | 102043272 A | 5/2011 |

(Continued)

OTHER PUBLICATIONS

Chinese Office Action issued in corresponding Chinese Patent Application No. 202111348098.6 dated Apr. 28, 2022, pp. 1-8.
(Continued)

*Primary Examiner* — Michael H Caley
*Assistant Examiner* — William D Peterson
(74) *Attorney, Agent, or Firm* — PV IP PC; Wei Te Chung

(57) ABSTRACT

A display device and a vehicle monitoring device are provided. The display device includes a display area and an infrared light-transmitting area adjacent to the display area. The display device includes a display panel, a backlight module, and an infrared sensor disposed on a side of the backlight module away from the display panel and corresponding to the infrared light-transmitting area. The display panel includes a display functional layer disposed in the display area. The display functional layer includes a color resist layer disposed in the display area.

20 Claims, 4 Drawing Sheets

(58) Field of Classification Search
USPC .......................................................... 349/106
See application file for complete search history.

(56) References Cited

FOREIGN PATENT DOCUMENTS

| | | | | | |
|---|---|---|---|---|---|
| CN | 206431397 | U | | 8/2017 | |
| CN | 110676301 | A | | 1/2020 | |
| CN | 111061086 | A | * | 4/2020 | ....... G02F 1/133512 |
| CN | 210628315 | U | | 5/2020 | |
| CN | 111554829 | A | | 8/2020 | |
| CN | 111725264 | A | * | 9/2020 | ........... H10K 50/865 |
| CN | 111812900 | A | | 10/2020 | |
| CN | 111882995 | A | | 11/2020 | |
| CN | 112331087 | A | | 2/2021 | |
| CN | 112558349 | A | | 3/2021 | |
| CN | 112968043 | A | | 6/2021 | |
| CN | 113138481 | A | | 7/2021 | |
| CN | 113495378 | A | * | 10/2021 | |
| JP | 2000047189 | A | | 2/2000 | |
| JP | 2015155987 | A | | 8/2015 | |

OTHER PUBLICATIONS

International Search Report in International application No. PCT/CN2021/132501, mailed on Aug. 17, 2022.
Written Opinion of the International Search Authority in International application No. PCT/CN2021/132501, mailed on Aug. 17, 2022.
Chinese Office Action in corresponding Chinese Patent Application No. 202111348098.6 dated Oct. 19, 2022, pp. 1-7.

* cited by examiner

DISPLAY DEVICE AND VEHICLE MONITORING DEVICE

FIELD

The present disclosure relates to the field of display technologies, and more particularly, to a display device and a vehicle monitoring device.

BACKGROUND

Driver monitor systems (DMSs) are mainly used to monitor driver's fatigue. The DMMs gradually progress and roll out more functions as autonomous driving, internet of vehicles, and relevant techniques become mature. To protect individual privacy, it is necessary to prevent human faces from being directly captured in a visible light environment. Also, sensors are desired to be hidden.

Currently, the most widely used way to monitor driver's states is to use active infrared sensors to collect infrared information within a waveband of 940±10 nm, thereby satisfying requirements of the DMSs. In addition, according to camera under panel (CUP) technologies commonly used in cell phones, the infrared sensors can be integrated into a cluster module and can be hidden in an integrated black structure.

However, because the DMSs collect infrared information within a waveband of 940±10 nm, infrared light intensity is decreased to a certain degree when infrared light passes through a cover glass and a display panel and reaches an infrared sensor below the display panel, affecting an imaging effect of the infrared sensor to a certain degree. Therefore, recognition efficiency of the DMSs is reduced. Even a recognition function of the DMSs fails. In conventional technologies, a color resist layer, a black matrix, and a spacer layer above an infrared sensor of a display panel are removed to increase infrared light transmittance. However, this structure causes a new issue: great color deviation occurs between an area where an infrared sensor is disposed and a display area in the display panel. Consequently, the infrared sensor cannot be hidden, affecting an integrated black structure of the display panels.

SUMMARY

Embodiments of the present disclosure provide a display device and a vehicle monitoring device to improve an integrated black structure of the display device.

An embodiment of the present disclosure provides a display device, comprising a display area and an infrared light-transmitting area disposed adjacent to the display area;
wherein the display device comprises a display panel, a backlight module, and an infrared sensor disposed on a side of the backlight module away from the display panel and corresponding to the infrared light-transmitting area; and
the display panel comprises a display functional layer disposed in the display area and an infrared light-transmitting functional layer disposed in the infrared light-transmitting area, the display functional layer comprises a color resist layer disposed in the display area, and a material of the infrared light-transmitting functional layer and a material of the color resist layer are same.

In the display panel provided by an embodiment of the present disclosure, the infrared light-transmitting functional layer at least comprises a first sub-color resist layer and a second sub-color resist layer which are stacked, and a color of the first sub-color resist layer and a color of the second sub-color resist layer are different.

In the display panel provided by an embodiment of the present disclosure, the first sub-color resist layer is a blue color resist layer, and a material of the second sub-layer is one of a green color resist layer or a red color resist layer.

In the display panel provided by an embodiment of the present disclosure, the display panel comprises a plurality of black matrixes, and an arrangement density of the black matrixes in the display area is greater than an arrangement density of the black matrixes in the infrared light-transmitting area.

In the display panel provided by an embodiment of the present disclosure, in a direction perpendicular to the display panel, a projection of the black matrixes is located in the display area.

In the display panel provided by an embodiment of the present disclosure, the display functional layer comprises a spacer layer stacked with the color resist layer, and the spacer layer at least comprises a plurality of first spacers disposed in the display area.

In the display panel provided by an embodiment of the present disclosure, the spacer layer comprises a plurality of second spacers disposed in the infrared light-transmitting area, and an arrangement density of the first spacers is greater than an arrangement density of the second spacers.

In the display panel provided by an embodiment of the present disclosure, the display panel comprises a black matrix, and in a direction perpendicular to the display panel, an orthographic projection of the black matrix at least covers an orthographic projection of the second spacers.

In the display panel provided by an embodiment of the present disclosure, the color resist layer comprises a plurality of first sub-color resists disposed in the display area, and the infrared transmitting functional area comprises a plurality of second sub-color resists disposed in the infrared light-transmitting area.

In the display panel provided by an embodiment of the present disclosure, an arrangement order of the first sub-color resists in the display area and an arrangement order of the second sub-color resists in the infrared light-transmitting area are same.

In the display panel provided by an embodiment of the present disclosure, an area of any one of the second sub-color resists in the infrared light-transmitting area is greater than an area of any one of the first sub-color resists in the display area.

In the display panel provided by an embodiment of the present disclosure, a width ratio of any one of the second sub-color resists in the infrared light-transmitting area to any one of the first sub-color resists in the display area is M:N; and
wherein M ranges from 90 μm to 120 μm, and N ranges from 45 μm to 60 μm.

An embodiment of the present disclosure further provides a vehicle monitoring device, comprising a display device, wherein the display device comprises a display area and an infrared light-transmitting area disposed adjacent to the display area;
the display device comprises a display panel, a backlight module, and an infrared sensor disposed on a side of the backlight module away from the display panel and corresponding to the infrared light-transmitting area; and
the display panel comprises a display functional layer disposed in the display area and an infrared light-transmitting functional layer disposed in the infrared light-transmitting area, the display functional layer comprises a color resist layer disposed in the display area, and a material of the infrared light-transmitting functional layer and a material of the color resist layer are same.

In the vehicle monitoring device provided by an embodiment of the present disclosure, the infrared light-transmitting functional layer at least comprises a first sub-color resist layer and a second sub-color resist layer which are stacked, and a color of the first sub-color resist layer and a color of the second sub-color resist layer are different.

In the vehicle monitoring device provided by an embodiment of the present disclosure, the first sub-color resist layer is a blue color resist layer, and a material of the second sub-layer is one of a green color resist layer or a red color resist layer.

In the vehicle monitoring device provided by an embodiment of the present disclosure, the display panel comprises a plurality of black matrixes, and an arrangement density of the black matrixes in the display area is greater than an arrangement density of the black matrixes in the infrared light-transmitting area.

In the vehicle monitoring device provided by an embodiment of the present disclosure, in a direction perpendicular to the display panel, a projection of the black matrixes is located in the display area.

In the vehicle monitoring device provided by an embodiment of the present disclosure, the display functional layer comprises a spacer layer stacked with the color resist layer, and the spacer layer at least comprises a plurality of first spacers disposed in the display area.

In the vehicle monitoring device provided by an embodiment of the present disclosure, the spacer layer comprises a plurality of second spacers disposed in the infrared light-transmitting area, and an arrangement density of the first spacers is greater than an arrangement density of the second spacers.

In the vehicle monitoring device provided by an embodiment of the present disclosure, the display panel comprises a black matrix, and in a direction perpendicular to the display panel, an orthographic projection of the black matrix at least covers an orthographic projection of the second spacers.

Regarding the beneficial effects: embodiments of the present disclosure provide a display device and a vehicle monitoring device. The display device comprises a display area and an infrared light-transmitting area disposed adjacent to the display area. The display device comprises a display panel, a backlight module, and an infrared sensor disposed on a side of the backlight module away from the display panel and corresponding to the infrared light-transmitting area. The display panel comprises a display functional layer disposed in the display area and an infrared light-transmitting functional layer disposed in the infrared light-transmitting area. The display functional layer comprises a color resist layer disposed in the display area, and a material of the infrared light-transmitting functional layer and a material of the color resist layer are same. Therefore, the display device can have a better integrated black structure.

DESCRIPTION OF DRAWINGS

Technical solutions and beneficial effects of the present disclosure are illustrated below in detail in conjunction with drawings and specific embodiments.

DETAILED DESCRIPTION

The present disclosure provides a display device and a vehicle monitoring device. Embodiments are further described below in detail with reference to accompanying drawings to make objectives, technical solutions, and effects of the present disclosure clearer and more precise. It should be noted that described embodiments are merely used to construct the present disclosure and are not intended to limit the present disclosure.

Embodiments of the present disclosure provide a display device and a vehicle monitoring device which are described below in detail. It should be noted that the description order of embodiments does not mean preferred orders of the embodiments.

Figure 1:
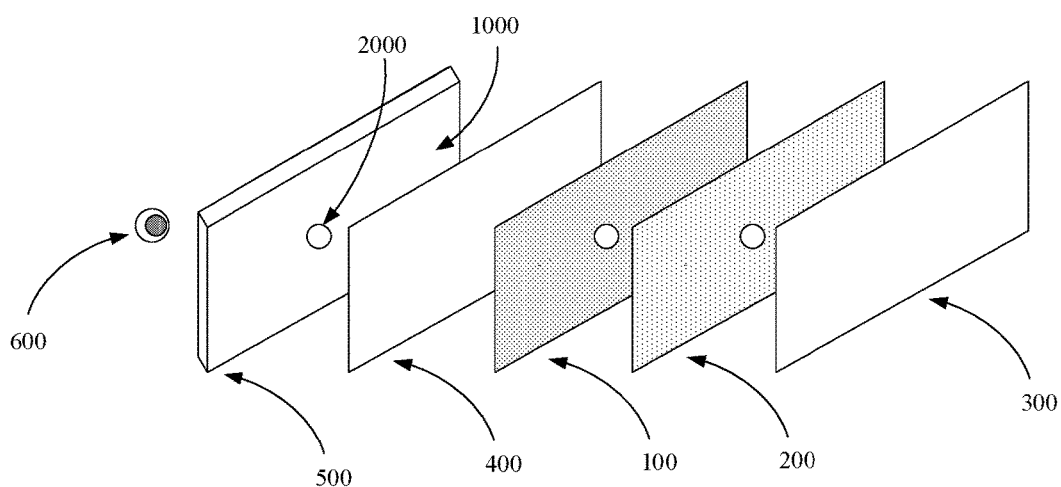
FIG. 1 is a structural schematic view showing a conventional display device.

Please refer to FIG. 1, a structural schematic view showing a conventional display device is provided.

Currently, driver monitor systems (DMSs) are mainly used to monitor driver's fatigue. The most widely used way to monitor driver's states is to use active infrared sensors to collect infrared information within a waveband of 940±10 nm, thereby satisfying requirements of the DMSs.

In conventional technologies, vehicle monitoring devices include a DMS and a display device. The display device includes a display panel, a first polarizer 300 disposed on a side of the display panel, a second polarizer 400 disposed on another side of the display panel, and a backlight module 500 and an infrared sensor 600 disposed on a side of the second polarizer 400 away from the display panel.

The display panel includes a display area 1000 and an infrared light-transmitting area 2000 adjacent to the display area 1000. The display panel includes a first substrate 100 and a second substrate 200 disposed opposite to each other, and a liquid crystal layer (not shown) disposed between the first substrate 100 and the second substrate 200. Wherein, the infrared sensor 600 is disposed in the infrared light-transmitting area 2000 and is configured to collect infrared information.

However, because the DMSs collect infrared information within a waveband of 940±10 nm, infrared light intensity is decreased to a certain degree when infrared light passes through a cover glass and a display panel and reaches the infrared sensor 600, affecting an imaging effect of the infrared sensor 600 to a certain degree. Therefore, recognition efficiency of the DMSs is reduced. Even a recognition function of the DMSs fails. Therefore, in conventional technologies, a color resist layer (not shown), a black matrix (not shown), and a spacer layer (not shown) above the infrared sensor 600 of the display panel are removed to increase infrared light transmittance. However, this structure causes a new issue: great color deviation occurs between the infrared light-transmitting area 2000 and the display area 1000 in the display device. Consequently, the infrared sensor 600 cannot be hidden, affecting an integrated black structure of the display device. To solve this issue, embodiments of the present disclosure provide a display device and a vehicle monitoring device to improve an integrated black structure of the display device.

Please refer to FIG. 2 to FIG. 7, embodiments of the present disclosure provide a display device and an infrared light-transmitting monitoring device. A display device 1 includes a display area 1000 and an infrared light-transmitting area 2000 adjacent to the display area 1000. The display device 1 includes a display panel 10, a backlight module 500, and an infrared sensor 600 disposed on a side of the backlight module 500 away from the display panel 100 and corresponding to the infrared light-transmitting area 2000. Wherein, the display panel 10 includes a display functional layer 100 disposed in the display area 1000 and an infrared light-emitting functional layer 30 disposed in the infrared light-emitting area 2000. The display functional layer 100 includes a color resist layer 23 disposed in the display area 1000. A material of the infrared light-transmitting functional layer 30 and a material of the color resist layer 23 are same.

The present disclosure provides the display device 1. The display device 1 includes the display area 1000 and the infrared light-transmitting area 2000 adjacent to the display area 1000. The display device 1 includes the display panel 10, the backlight module 500, and the infrared sensor 600 disposed on the side of the backlight module 500 away from the display panel 100 and corresponding to the infrared light-transmitting area 2000. The display panel 10 includes the display functional layer 100 disposed in the display area 1000. By disposing the infrared light-transmitting functional layer 30 in the infrared light-transmitting area 2000 and making the material of the infrared light-transmitting functional layer 30 and the material of the color resist layer 23 same, a color reflected by the infrared light-transmitting area 2000 and a color reflected by the display area 1000 are same. As such, the display device 1 can have a better integrated black structure.

Technical solutions provided by the present disclosure are described in conjunction with specific embodiments.

Figure 2:
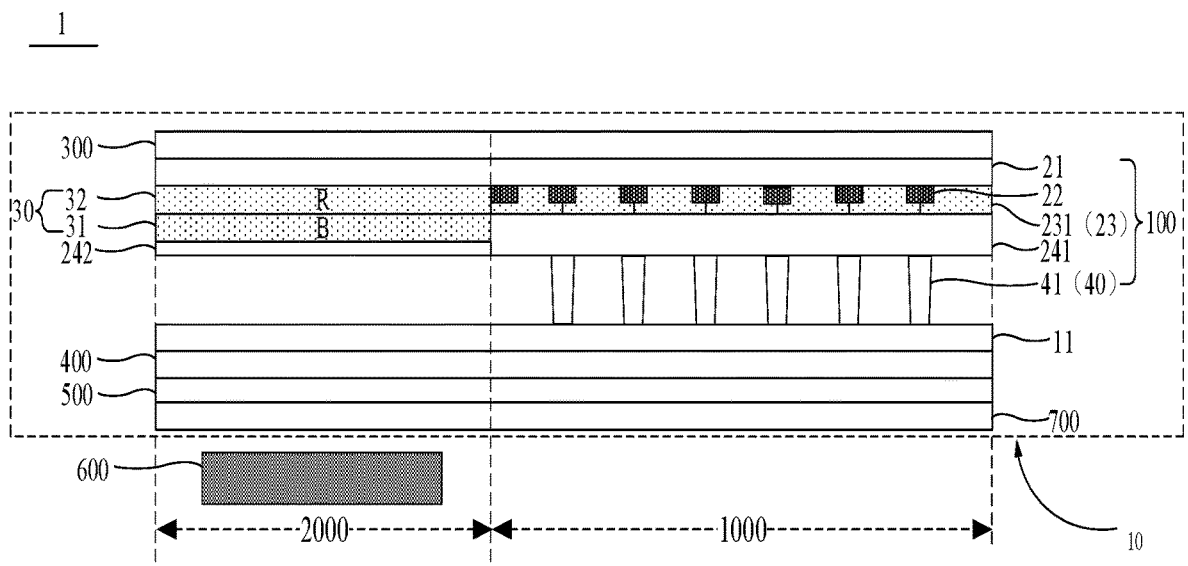
FIG. 2 is a first partly structural schematic view showing a display device provided by an embodiment of the present disclosure.

Please refer to FIG. 2, a first partly structural schematic view showing the display device provided by the embodiment of the present disclosure is provided.

The present embodiment provides the display device 1. The display device 1 includes the display area 1000 and the infrared light-transmitting area 2000 adjacent to the display area 1000. The display panel 10 includes, but is not limited to, a light-emitting diode (LED) display panel 10. The present embodiment does not limit the display panel 10. Wherein, the display panel 10 includes, but is not limited to, stacked common layers including a gate, an active layer, and a source/drain layer, which are not described in detail here. It should be noted that the display device 10 of the present embodiment is the LED display panel 10 which is taken as an example to describe technical solutions of the present disclosure.

The display device 1 further includes the backlight module 500 and the infrared sensor 600 disposed on the side of the backlight module 500 away from the display panel 10 and corresponding to the infrared light-transmitting area 2000. The display device 1 further includes a first polarizer 300 disposed on a side of the display panel 10 and a second polarizer 400 disposed on another side of the display panel 10. Wherein, the second polarizer 400 is disposed between the display panel 10 and the backlight module 500. The infrared sensor 600 collects infrared information having a waveband of 940±10 nm.

The display panel 10 includes the display functional layer 100 disposed in the display area 1000 and the infrared light-transmitting functional layer 30 disposed in the infrared light-emitting area 2000. Specifically, the display panel 10 includes a first transparent base 11 and a second transparent base 21 disposed opposite to each other and a liquid crystal layer (not shown) disposed between the first transparent base 11 and the second transparent base 21. Wherein, visible light (having a wavelength ranging 400 nm to 700 nm, for example) transmittance of the infrared light-transmitting functional layer 30 is relatively low, which does not affect infrared light (having a wavelength of 940 nm, for example) transmittance. The infrared light transmittance of the infrared light-transmitting functional layer 30 is greater than 90%.

It should be noted that the first transparent base 11 and the second transparent base 21 both include a rigid substrate or a flexible substrate. When the first transparent base 11 and the second transparent base 21 both are rigid substrates, a material thereof may be metal or glass. When the first transparent base 11 and the second transparent base 21 both are flexible substrates, a material thereof may include at least one of an acrylic resin, a methacrylic resin, polyisoprene, a vinyl resin, an epoxy-based resin, a polyurethane-based resin, a cellulose resin, a siloxane resin, a polyimide-based resin, or a polyamide-based resin. Wherein, using a polyimide material can effectively increase light transmittance. In the present embodiment, the first transparent base 11 and the second transparent base 21 both are polyimide, which is taken as an example for describing technical solutions of the present disclosure.

The display functional layer 100 includes the color resist layer 23 disposed on a side of the second transparent base 21 close to the first transparent base 11. The infrared light-transmitting functional layer 30 is disposed on the side of the second transparent base 21 close to the first transparent base 11. Wherein, the material of the infrared light-transmitting functional layer 30 and the material of the color resist layer 23 are same.

Wherein, the color resist layer 23 at least includes a red sub-color resist material, a green sub-color resist material, and a blue sub-color resist material. Of course, the color resist layer 23 may have other color resist materials with other colors according to practical requirements. Alternatively, all or part of the material of the color resist layer 23 may be replaced by the above color resist materials which can be a yellow color resist material. The present embodiment does not limit the material of the color resist layer 23. Specifically, the color resist layer 23 includes a first sub-color resist 231 disposed in the display area 1000. The first color resist 231 includes, but is not limited to, one of a red sub-color resist, a green sub-color resist, or a blue sub-color resist.

It should be noted that a thickness of the color resist layer 23 is 2 μm, which is taken as an example for describing technical solutions provided by the embodiment of the present disclosure.

Preferably, in the present embodiment, the infrared light-transmitting functional layer 30 at least includes a first sub-color resist layer 31 and a second sub-color resist layer 32 which are stacked. A color of the first sub-color resist layer 31 and a color of the second sub-color resist layer 32 are different. Specifically, the infrared light-transmitting layer 30 includes the sub-color resist layer 31 and the sub-color resist layer 32 which are stacked. A material of the color of the first sub-color resist layer 31 and a material of the second sub-color resist layer 32 are different. Wherein, the first sub-color resist layer 31 is a blue sub-color resist layer, and the material of the second sub-color resist layer 32 is a green sub-color resist layer or a red-color resist layer. Specifically, the first sub-color resist layer 31 is a blue sub-color resist layer and the second sub-color resist layer 32 is a red sub-color resist layer, which are taken as examples for describing technical solutions of the embodiment of the present disclosure.

In the present embodiment, the second sub-color resist layer 32 is disposed between the first sub-color resist layer 31 and the second transparent base 21. The first sub-color resist layer 31 and the second sub-color resist layer 32 have an integrated structure. Both the first sub-color resist layer 31 and the second sub-color resist layer 32 are disposed in the infrared light-transmitting area 2000. Both an orthographic projection of the first sub-color resist layer 31 on the display panel 10 and an orthographic projection of the second sub-color resist layer 32 on the display panel 10 cover an orthographic projection of the infrared sensor 600 on the display panel 10.

TABLE 1

|   |   | Seamless ΔE |
|---|---|---|
| R | SCI | 1.5~2.1 |
|   | SCE | 3.2~3.8 |
| G | SCI | 1.8~2.4 |
|   | SCE | 2.1~2.7 |
| R + B | SCI | 1.8~2.4 |
|   | SCE | 0.9~1.5 |
| G + B | SCI | 2.0~2.6 |
|   | SCE | 2.1~2.7 |
| R + G + B 2.5 um | SCI | 1.5~2.1 |
|   | SCE | 3.1~3.7 |
| R + G + B 2.0 um | SCI | 1.8~2.4 |
|   | SCE | 0.6~1.2 |

Please refer to table 1, in the present embodiment, when the thickness of the color resist layer 23 is 2 μm and the red sub-color resist, the green sub-color resist, and the blue sub-color resist are sequentially arranged, reflective color deviation ΔE1 ranges from 1.8 to 2.4. When the blue sub-color resist and the red sub-color resist are stacked, reflective color deviation ΔE2 ranges from 1.8 to 2.4. Therefore, in the present embodiment, the second sub-color resist layer 32 and the first sub-color resist layer 31 are sequentially stacked on the second transparent base 21 in the infrared light-transmitting area 2000. Wherein, the second sub-color resist layer 32 is a red sub-color resist layer, and the first color-resist layer 31 is a blue sub-color resist layer. As such, the reflective color deviation ΔE2 of the infrared light-transmitting area 2000 can be basically equal to the reflective color deviation ΔE1 of the display area 1000, thereby allowing the display device 1 to have a better integrated black structure.

It should be noted that, in the present embodiment, the infrared light-emitting functional layer 30 includes the first sub-color resist layer 31 and the second sub-color resist layer 32 which are stacked. The first sub-color resist layer 31 is a bleu sub-color resist layer, and the second sub-color resist layer 32 is a red sub-color resist layer. The first sub-color resist layer 31 is disposed between the second sub-color resist layer 32 and the second transparent base 21, which is taken as an example for only description.

Furthermore, in the present embodiment, the display panel 10 further includes a plurality of black matrixes 22 disposed on a side of the second transparent base 21 close to the first transparent base 11. An arrangement density of the black matrixes 22 in the display area 1000 is greater than an arrangement density of the black matrixes 22 in the infrared light-transmitting area 2000.

Preferably, in the present embodiment, in a direction perpendicular to the display panel 10, an orthographic of the black matrixes 22 is located in the display area 1000. Specifically, the orthographic of the black matrixes 22 on the second transparent base 21 is located in the display area 1000.

In the present embodiment, the black matrix 22 is disposed between two adjacent sub-color resists 231 and is configured to define a boundary between each of the sub-color resists 231. Furthermore, to prevent light leakage between the sub-color resists 231 adjacent to each other. Typically, an edge of the sub-color resists 231 is arranged to overlap the black matrix 22.

Preferably, in the present embodiment, the display functional layer 100 further includes a first photoresist layer 241 disposed on the color resist layer 23 close to the first transparent base 11 and a second photoresist layer 241 disposed on a side of the infrared light-transmitting functional layer 30 close to the first transparent base 11. Wherein, a total thickness of the color resist layer 23 and the first photoresist layer 241 is equal to a total thickness of the second photoresist layer 241, the first sub-color resist layer 31, and the second sub-color resist layer 32.

It should be understood that, in the present embodiment, edges of two adjacent first sub-color resists 231 overlap with each other on the black matrix 22. Therefore, a horn-shaped gap may be formed in the overlapping area because the sub-color resists 231 may be stacked on the overlapping area. Heavily stacked sub-color resists 231 will cause a relief on a side of the second transparent base 21 close to the first transparent base 11, affecting an orientation of liquid crystals around the stacked sub-color resists 231 and reducing efficiency of the liquid crystals. In the present disclosure, the first photoresist layer 241 is disposed on the side of the color resist layer 23 close to the first transparent base 11, and the second photoresist layer 242 is disposed on the side of the first sub-color resist layer 31 away from the second color resist layer, thereby ensuring flatness of the display panel 10.

TABLE 2

|   | layer structure | infrared light transmittance |
|---|---|---|
| second substrate | black matrix | <10% |
|   | red sub-color resist | >90% |
|   | green sub-color resist | >90% |
|   | blue sub-color resist | >90% |

Please refer to table 2. In the present embodiment, the black matrix 22 will shield infrared light. That is, when infrared light passes through the black matrix 22, intensity of the infrared light will be reduced to a certain degree. Infrared light transmittance is less affected by the red sub-color resist, the green sub-color resist, and the blue sub-color resist. Therefore, an effect of the color resist layer 23 shielding infrared light can be ignored. As such, in the present embodiment, by disposing the infrared light-transmitting functional layer 30 in the infrared light-transmitting area 2000 and making the material of the infrared light-transmitting functional layer 30 and the material of the color resist layer 23 same, the display device 1 can have visual aesthetics of an integrated black structure. Moreover, the black matrix 200 is disposed in the display area 1000 and is not disposed in the infrared light-transmitting area 2000. Therefore, infrared light transmittance of the infrared light-transmitting area 2000 can be increased, and an infrared imaging effect of the infrared sensor 600 can be further improved.

It should be noted that color reflected by each sub-color resist layer of the display panel 10 noted in table 1 and infrared light transmittance of each layer of the second transparent base 21 of the display panel 10 noted in table 2 are only reference data which may be changed because of an environment, a material of each layer, and personal factors. Data provided by the present embodiment are only description examples.

Furthermore, in the present embodiment, the display functional layer 100 further includes a spacer layer 40 disposed between the first transparent base 11 and the second transparent base 21. A projection of the spacer layer 40 on the second transparent base 21 is located in the display area 1000. Specifically, the spacer layer 40 is disposed between the first transparent base 11 and the second transparent base 21. The spacer layer 40 includes a plurality of spacers 41 which are ring-shaped and surround the infrared light-transmitting area 2000. Wherein, the spacers 41 are conical frustum-shaped. Moreover, the spacers 41 are upside down disposed between the first transparent base 11 and the second transparent base 21. That is, an end, which has a greater radius, of the spacers 41 directs toward the second transparent base 21, and an end, which has a smaller radius, of the spacers 41 directs toward the first transparent base 11, thereby realizing a great supporting effect. Also, the spacers 41 surround the infrared light-transmitting area 2000, thereby preventing bad phenomena, such as diffraction, from occurring on the spacer layer 40 after infrared light enters the display panel 10.

Moreover, in the present embodiment, the display device 1 further includes an optical coating layer 700 disposed on a side of the first transparent base 11 away from the second transparent base 21. A thickness of the optical coating layer 700 is $\lambda/4$. Wherein, $\lambda$ is a wavelength of red light. Specifically, in the present embodiment, $\lambda$ is 940±10 nm and is a wavelength of infrared light, and the thickness of the optical coating layer 700 is 235 nm.

In the present embodiment, the optical coating layer 700 is disposed on a side of the first substrate 100 away from the second substrate 200. A material of the optical coating layer includes, but is not limited to, magnesium fluoride, zirconium dioxide, and silicon dioxide. A refractive index of the optical coating layer 700 ranges from 1 to 1.5. The optical coating layer 700 has a structure including multiple high refractive index films and multiple low refractive index films, which are alternately disposed on one another. This structure can reduce reflection of infrared light on the display panel 10, thereby effectively increasing infrared light transmittance.

It should be noted that a thickness of the optical coating layer 700 can be determined according to light in different wavebands, and a refractive index of a material of the optical coating layer 700 and a number of the optical coating layer 700 can be determined according to different interfaces. In the present embodiment, the wavelength A of infrared light is 940±10 nm, and the thickness of the optical coating layer 700 is 235 nm, which are taken as examples for describing technical solutions provided by the embodiment of the present disclosure.

Figure 3:
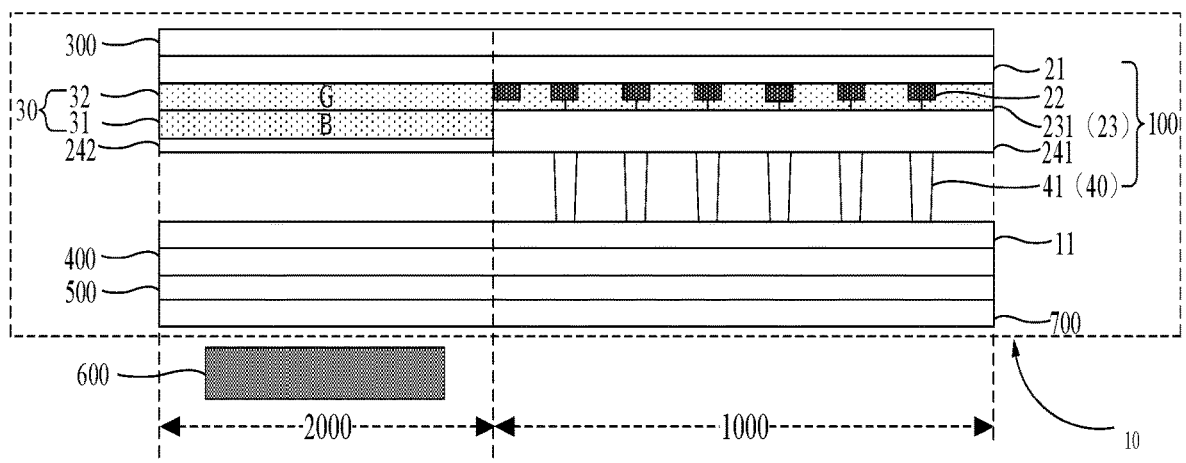
FIG. 3 is a second partly structural schematic view showing the display device provided by the embodiment of the present disclosure.

Please refer to FIG. 3, a second partly structural schematic view showing the display device provided by the embodiment of the present disclosure is provided.

The structure of the display device 1 of the present embodiment and the first structure of the display device 1 of the above embodiment are similar or the same, which can be referred to description of the display device 1 of the above embodiment and is not described here again. A difference between the present embodiment and the above embodiment is:

In the present embodiment, the infrared light-transmitting functional layer 30 at least includes the first sub-color resist 31 and the second sub-color resist 32 which are stacked. The color of the first sub-color resist layer 31 and the color of the second sub-color resist 32 are different. Specifically, the material of the first sub-color resist layer 31 and the material of the second sub-color resist layer 32 are different. Wherein, the first sub-color resist layer 31 is a blue sub-color resist layer, and the material of the second sub-color resist layer 32 is a green sub-color resist or a red sub-color resist. In the present embodiment, the first sub-color resist layer 31 is a blue sub-color resist layer, and the second sub-color resist layer 32 is a green sub-color resist layer, which are taken as examples for describing technical solutions of the embodiment of the present disclosure.

Please refer to table 1, in the present embodiment, when the thickness of the color resist layer 23 is 2 μm and the red sub-color resist, the green sub-color resist, and the blue sub-color resist are sequentially arranged, reflective color deviation $\Delta E1$ ranges from 1.8 to 2.4. When the blue sub-color resist and the green sub-color resist are stacked, reflective color deviation $\Delta E3$ ranges from 2.0 to 2.6. Therefore, in the present embodiment, the second sub-color resist layer 32 and the first sub-color resist layer 31 are sequentially stacked on the second transparent base 21 in the infrared light-transmitting area 2000. Wherein, the second sub-color resist layer 32 is a red sub-color resist layer, and the first color-resist layer 31 is a green sub-color resist layer. As such, the reflective color deviation $\Delta E3$ of the infrared light-transmitting area 2000 can be basically equal to the reflective color deviation $\Delta E1$ of the display area 1000, thereby allowing the display device 1 to have a better integrated black structure.

Figure 4:
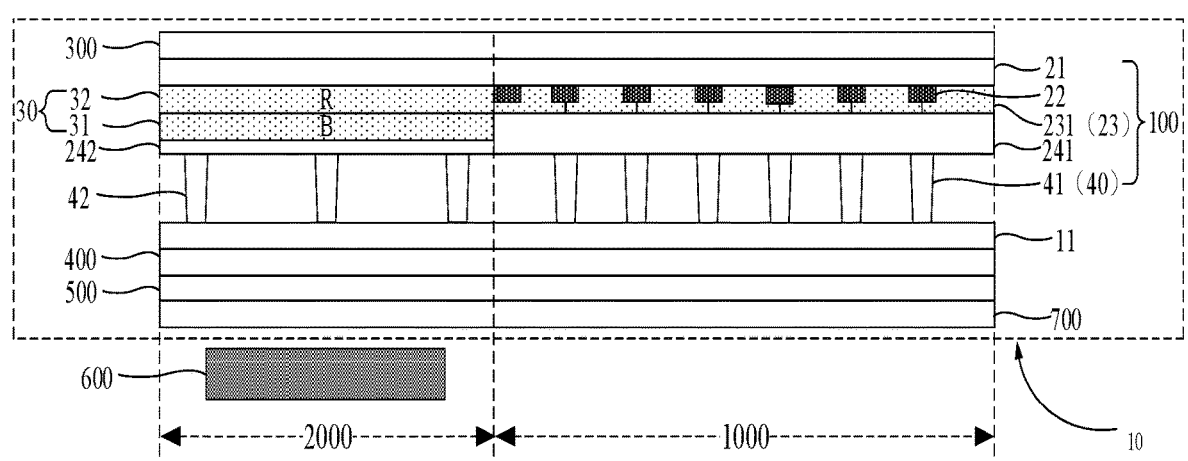
FIG. 4 is a third partly structural schematic view showing the display device provided by the embodiment of the present disclosure.

Please refer to FIG. 4, a third partly structural schematic view showing the display device provided by the embodiment of the present disclosure is provided.

The structure of the display device 1 of the present embodiment and the first structure of the display device 1 of the above embodiment are similar or the same, which can be referred to description of the display device of the above embodiment and is not described here again. A difference between the present embodiment and the above embodiment is:

In the present embodiment, the spacer layer 40 further includes a plurality of second spacers 42 disposed in the infrared light-transmitting area 2000. Wherein, an arrangement density of the first spacers 41 is greater than an arrangement density of the second spacers 42.

It should be understood that, in the present embodiment, the second spacers 42 are disposed in the infrared light-transmitting area 2000. The second spacers 42 have a supporting function, making a thickness of the display panel 10 even and stable, thereby improving a display effect. Also, strength of the first transparent base 11 and strength of the second transparent base 21 in the infrared light-transmitting area 2000 are enhanced, thereby preventing a surface of the first transparent base 11 and a surface of the second transparent base 21 from being arched or deformed. Moreover, the arrangement density of the first spacers 41 in the display area 1000 is greater than the arrangement density of the second spacers 42 in the infrared light-transmitting area 2000. That is, the first spacers 41 are densely distributed in the display area 1000, and the second spacers 42 are sparsely distributed in the infrared light-transmitting area 2000. Therefore, in the light-transmitting area 2000, an area of an interval between adjacent second spacers 42 is increased, thereby increasing the infrared light transmittance of the light-transmitting area 2000, and further improving an infrared imaging effect of the infrared sensor 600.

Figure 5:
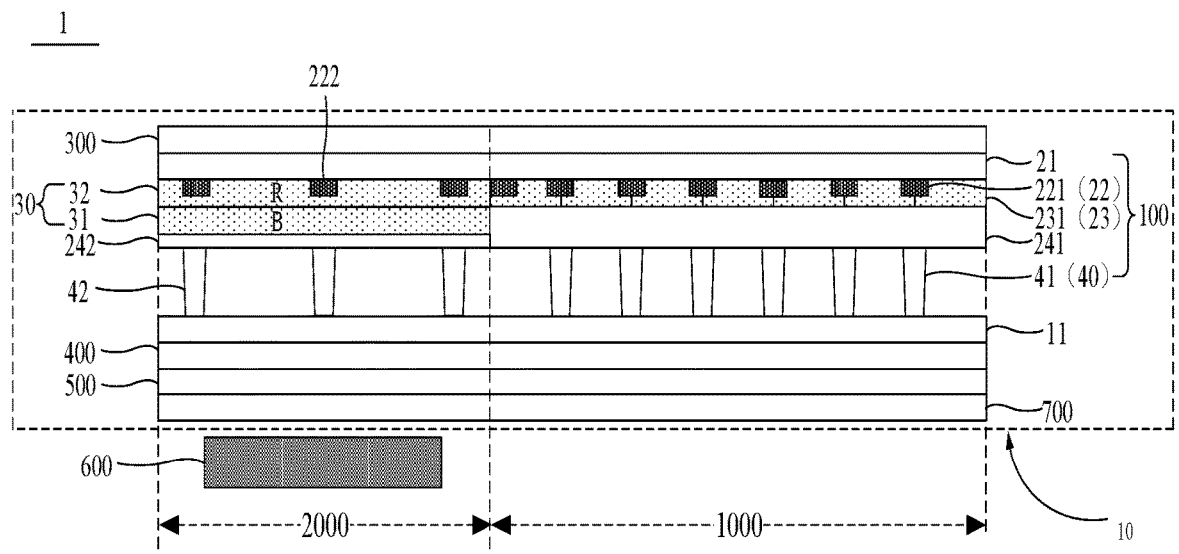
FIG. 5 is a fourth partly structural schematic view showing the display device provided by the embodiment of the present disclosure.

Please refer to FIG. 5, a fourth partly structural schematic view showing the display device provided by the embodiment of the present disclosure is provided.

The structure of the display device 1 of the present embodiment and the third structure of the display device 1 of the above embodiment are similar or the same, which can be referred to description of the display device of the above embodiment and is not described here again. A difference between the present embodiment and the above embodiment is:

In the present embodiment, the black matrixes 22 are disposed in the display area 1000 and the infrared light-transmitting area 2000. In addition, in the direction perpendicular to the display panel 10, the orthographic projection of the black matrixes 22 at least covers an orthographic projection of the second spacers 42.

Specifically, in the present embodiment, the black matrixes 22 include a plurality of first black matrix blocks 221 disposed in the display area 1000 and a plurality of second black matrix blocks 222 disposed in the infrared light-transmitting area 2000. Wherein, in the direction perpendicular to the display panel 10, the orthographic projection of first black matrix blocks 221 covers the orthographic projection of the first spacers 41, and the orthographic projection of the second black matrix blocks 222 covers the orthographic projection of the second spacers 42. The first black matrix blocks 221 and the first spacers 41 have a one-to-one correspondence, and the second black matrix blocks 222 and the second spacers 42 have a one-to-one correspondence.

It should be noted that, in the present embodiment, any one of the first black matrix blocks 221 is disposed between two adjacent first sub-color resists 231, thereby defining a boundary between each of the first sub-color resists 231. Moreover, to prevent light leakage between the first sub-color resists 231 adjacent to each other. Typically, an edge of the first sub-color resists 231 is arranged to overlap the first black matrix blocks 221. The second black matrix blocks 222 are disposed between the second sub-color resist layer 32 and the second transparent base 21.

It should be understood that, in the present embodiment, in the direction perpendicular to the display panel 10, the orthographic projection of first black matrix blocks 221 covers the orthographic projection of the first spacers 41, and the orthographic projection of the second black matrix blocks 222 covers the orthographic projection of the second spacers 42. As such, light reflected by the first spacers 41 and the second spacers 42 can be reduced, thereby preventing light spots from occurring on the display panel 10.

Figure 6:
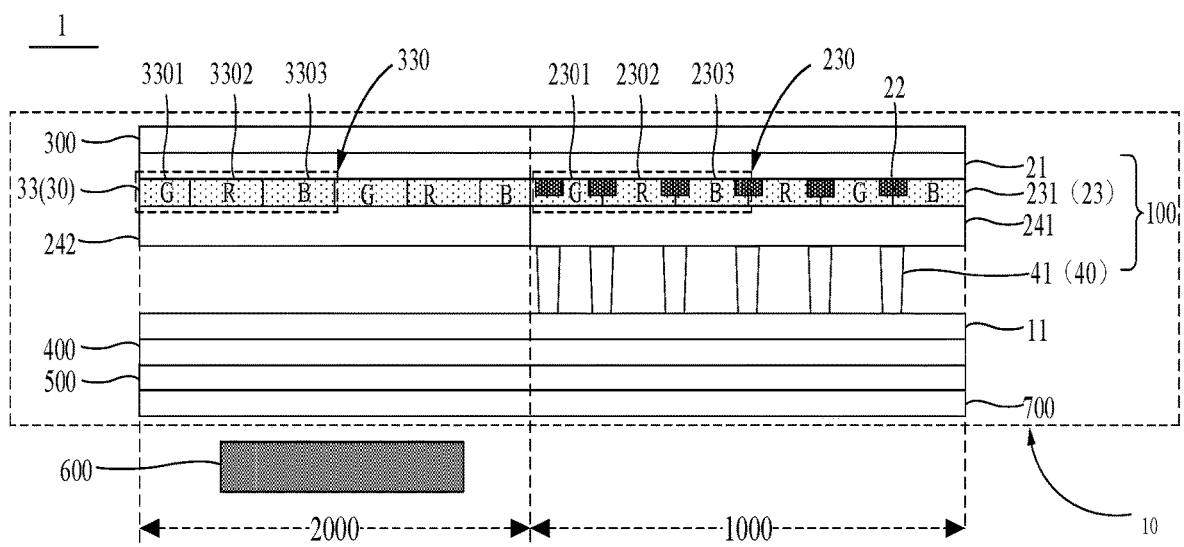
FIG. 6 is a fifth partly structural schematic view showing the display device provided by the embodiment of the present disclosure.

Please refer to FIG. 6, a fifth partly structural schematic view showing the display device provided by the embodiment of the present disclosure is provided.

The structure of the display device 1 of the present embodiment and the first structure of the display device 1 of the above embodiment are similar or the same, which can be referred to description of the display device of the above embodiment and is not described here again. A difference between the present embodiment and the above embodiment is:

In the present embodiment, the infrared light-transmitting functional layer 30 includes a plurality of second sub-color resists 33 disposed in the infrared light-transmitting area 2000. The second sub-color resists 33 include, but are not limited to, one of a red sub-color resist, a green sub-color resist, or a bleu sub-color resist. Wherein, an area of any one of the second sub-color resists 33 disposed in the infrared light-transmitting area 2000 is equal to an area of any one of the first sub-color resists 231 in the display area 1000.

Specifically, in the present embodiment, the color resist layer 23 is formed from a plurality of second color resist units 330 arranged in several rows.

Furthermore, in the present embodiment, each of a plurality of first color resist units 230 disposed in the display area 1000 includes a first sub-color resist block 2301, a second sub-color resist block 2302, and a third sub-color resist block 2303, which are sequentially arranged. Each of the second color resist units 330 disposed in the infrared light-transmitting area 2000 includes a fourth sub-color resist block 3301, a fifth sub-color resist block 3302, and a sixth sub-color resist block 3303, which are sequentially arranged. A material of the first sub-color resist block 2301 and a material of the fourth sub-color resist block 3301 are same, a material of the second sub-color resist block 2301 and a material of the fifth sub-color resist block 3302 are same, and a material of the third sub-color resist block 2303 and a material of the sixth sub-color resist block 3303 are same.

In the present embodiment, the first sub-color resist block 2301 and the fourth sub-color resist block 3301 are green sub-color resists, the second sub-color resist block 2302 and the fifth sub-color resist block 3302 are red sub-color resists, and the third sub-color resist block 2303 and the sixth sub-color resist block 3303 are blue sub-color resists, which are taken as examples for describing technical solutions of the embodiment of the present disclosure.

Please refer to table 1, in the present embodiment, each of the of first color resist units 230 disposed in the display area 1000 includes the first sub-color resist block 2301, the second sub-color resist block 2302, and the third sub-color resist block 2303, which are sequentially arranged. Each of the second color resist units 330 disposed in the infrared light-transmitting area 2000 includes the fourth sub-color resist block 3301, the fifth sub-color resist block 3302, and the sixth sub-color resist block 3303, which are sequentially arranged. The material of the first sub-color resist block 2301 and the material of the fourth sub-color resist block 3301 are same, the material of the second sub-color resist block 2301 and the material of the fifth sub-color resist block 3302 are same, and the material of the third sub-color resist block 2303 and the material of the sixth sub-color resist block 3303 are same. Therefore, the reflective color deviation $\Delta E3$ of the infrared light-transmitting area 2000 can be basically equal to the reflective color deviation $\Delta E1$ of the display area 1000, thereby allowing the display device 1 to have a better integrated black structure.

It should be noted that, in the present embodiment, a color of the first sub-color resist block 2301, a color of the second sub-color resist block 2302, a color of the third sub-color resist block 2303, a color of the fourth sub-color resist block 3301, a color of the fifth sub-color resist block 3302, and a color of the sixth sub-color resist block 3303 are not limited.

Figure 7:
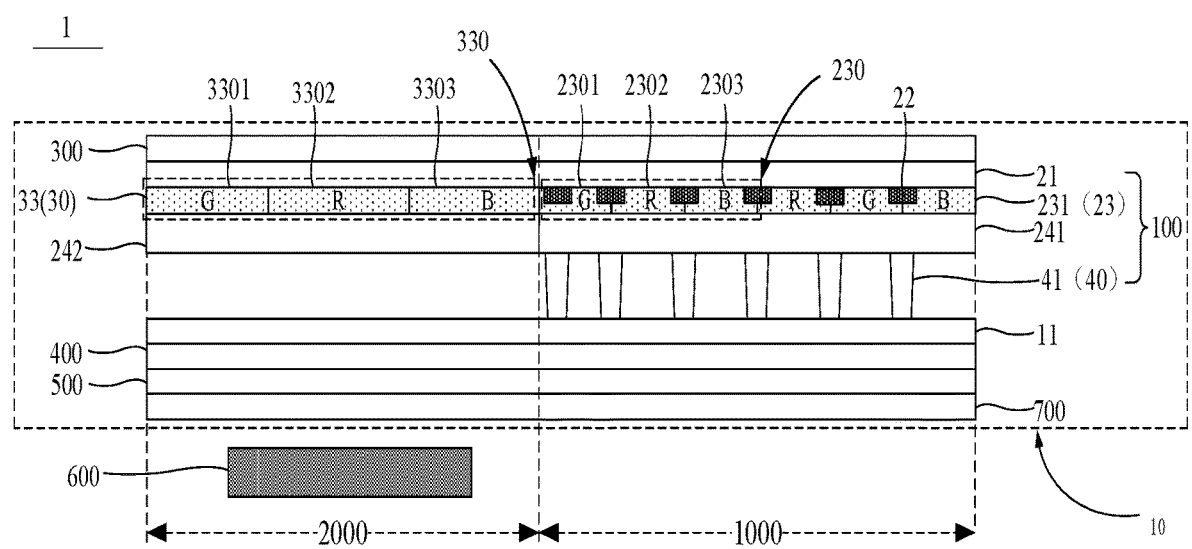
FIG. 7 is a sixth partly structural schematic view showing the display device provided by the embodiment of the present disclosure.

Please refer to FIG. 7, a sixth partly structural schematic view showing the display device provided by the embodiment of the present disclosure is provided.

The structure of the display device 1 of the present embodiment and the fifth structure of the display device 1 of the above embodiment are similar or the same, which can be referred to description of the display device of the above embodiment and is not described here again. A difference between the present embodiment and the above embodiment is:

Specifically, in the present embodiment, the color resist layer 23 includes the first sub-color resists 231 disposed in the display area 1000, and the infrared light-transmitting functional layer 30 includes the second sub-color resists 33 disposed in the infrared light-transmitting area 2000. Wherein, an area of any one of the second sub-color resists 33 disposed in the infrared light-transmitting area 2000 is equal to an area of any one of the first sub-color resists 231 disposed in the display area 1000.

Furthermore, in the present embodiment, each of the second color resist units 330 disposed in the infrared light-transmitting area 2000 includes the fourth sub-color resist block 3301, the fifth sub-color resist block 3302, and the sixth sub-color resist block 3303. An area of the fourth sub-color resist block 3301, an area of the fifth sub-color resist block 3302, and an area of the sixth sub-color resist block 3303 may be equal or different, which is not limited by the present embodiment.

In the present embodiment, any one of the second sub-color resists 33 disposed in the infrared light-transmitting area 2000 is greater than any one of the first sub-color resists 231 disposed in the display area 1000. Specifically, a width ratio of any one of the second sub-color resists 33 disposed in the infrared light-transmitting area 2000 to any one of the first sub-color resists 231 disposed in the display area 1000 is M:N. Wherein, M ranges from 90 μm to 120 μm, and N ranges from 45 μm to 60 μm. Preferably, any one of the second sub-color resists 33 disposed in the infrared light-transmitting area 2000 is 100 μm, any one of the first sub-color resists 231 disposed in the display area 1000 is 50 μm, and the width ratio of any one of the second sub-color resists 33 disposed in the infrared light-transmitting area 2000 to any one of the first sub-color resists 231 disposed in the display area 1000 is 2:1.

It should be noted that any one of the second sub-color resists 33 disposed in the infrared light-transmitting area 2000 is 100 μm, and any one of the first sub-color resists 231 disposed in the display area 1000 is 50 μm, which are only description examples and are limited by the present embodiment.

It should be noted that when the area of the second sub-color resists 33 is too small, bad phenomena, such as diffraction, may occur on the second sub-color resists 33 after infrared light enters the infrared light-transmitting functional layer, reducing an infrared imaging effect of the infrared sensor 600. Therefore, in the present embodiment, the area of the second sub-color resists 33 disposed in the infrared light-transmitting area 2000 is increased to prevent the above issue. Moreover, the width ratio of any one of the second sub-color resists 33 disposed in the infrared light-transmitting area 2000 to any one of the first sub-color resists 231 disposed in the display area 1000 is 2:1, which is beneficial for simplifying manufacturing processes of the display device 1.

It should be understood that, in the present embodiment, by increasing the area of the second sub-color resists 33 disposed in the infrared light-transmitting area 2000, bad phenomena, such as diffraction, can be prevented from occurring on the second sub-color resists 33 after infrared light enters the infrared light-transmitting functional layer. Therefore, the infrared light transmittance of the infrared light-transmitting area 2000 is increased, and the infrared imaging effect of the infrared sensor 600 is improved.

Furthermore, in the present embodiment, an arrangement order of the first sub-color resists 231 disposed in the display area 1000 and an arrangement order of the second sub-color resists 33 disposed in the infrared light-transmitting area 2000 are same.

Specifically, along a direction from the infrared light-transmitting area 2000 toward the display area 1000, both the first sub-color resists 231 disposed in the display area 1000 and the second sub-color resists 33 disposed in the infrared light-transmitting area 2000 area arranged in an array manner in a first order. The first order includes, but is not limited to, a green sub-color resist, a red sub-color resist, and a blue sub-color resist alternately arranged.

It should be understood that, in the present embodiment, the arrangement order of the first sub-color resists 231 disposed in the display area 1000 and the arrangement order of the second sub-color resists 33 disposed in the infrared light-transmitting area 2000 are same, which is beneficial for simplifying manufacturing processes of the display device 1. Also, the infrared light transmittance of the infrared light-transmitting area 2000 is further improved.

The present embodiment provides a vehicle monitoring device. The vehicle monitoring device includes any one of the display devices 1 of the above-mentioned embodiment and a driver monitor system (DMS).

Please refer to FIGS. 2 to 7. In the present embodiment, the DMS includes, but is not limited to, a smoking monitoring module, a call monitoring module, a distraction monitoring module, and an unfastened seat belt monitoring module. The infrared sensor 600 collects infrared information having a waveband of 940±10 nm. Wherein, the DMS realizes a monitoring function according to infrared information having a waveband of 940±10 nm collected by the infrared sensor 600.

In summary, the present disclosure provides a display device and a vehicle monitoring device. The display device includes a display area and an infrared light-transmitting area adjacent to the display area. The display device includes a display panel, a backlight module, and an infrared sensor disposed on a side of the backlight module away from the display panel and corresponding to the infrared light-transmitting area. The display panel includes a display functional layer disposed in the display area. The display functional layer includes a color resist layer disposed in the display area. By disposing an infrared light-transmitting functional layer in the infrared light-transmitting area and making a material of the infrared light-transmitting functional layer and a material of the color resist layer same, color reflected by the infrared light-transmitting area and color reflected by the display area can be same. Therefore, the display device can have a better integrated black structure.

It should be noted that many changes and modifications to the described embodiments can be carried out by those skilled in the art, and all such changes and modifications are intended to be included within the scope of the appended claims.

What is claimed is:

1. A display device, comprising a display area and an infrared light-transmitting area disposed adjacent to the display area;
   wherein the display device comprises a display panel, a backlight module, and an infrared sensor disposed on a side of the backlight module away from the display panel and corresponding to the infrared light-transmitting area; and
   the display panel comprises a display functional layer disposed in the display area and an infrared light-transmitting functional layer disposed in the infrared light-transmitting area, the display functional layer comprises a color resist layer disposed in the display area, and a material of the infrared light-transmitting functional layer and a material of the color resist layer are same, the display functional layer further comprises a first photoresist layer disposed on the color resist layer facing toward the side of the backlight module, a second photoresist layer connected to the first photoresist layer is disposed on a side of the infrared light-transmitting functional layer facing toward the side of the backlight module.

2. The display device of claim 1, wherein the infrared light-transmitting functional layer at least comprises a first sub-color resist layer and a second sub-color resist layer which are stacked, and a color of the first sub-color resist layer and a color of the second sub-color resist layer are different.

3. The display device of claim 2, wherein the first sub-color resist layer is a blue color resist layer, and a material of the second sub-color resist layer is one of a green color resist layer or a red color resist layer.

4. The display device of claim 2, wherein the display panel comprises a plurality of black matrixes, and an arrangement density of the black matrixes in the display area is greater than an arrangement density of the black matrixes in the infrared light-transmitting area.

5. The display device of claim 4, wherein in a direction perpendicular to the display panel, a projection of the black matrixes is located in the display area.

6. The display device of claim 2, wherein the display functional layer comprises a spacer layer stacked with the color resist layer, and the spacer layer at least comprises a plurality of first spacers disposed in the display area.

7. The display device of claim 6, wherein the spacer layer comprises a plurality of second spacers disposed in the infrared light-transmitting area, and an arrangement density of the first spacers is greater than an arrangement density of the second spacers.

8. The display device of claim 7, wherein the display panel comprises a black matrix, and in a direction perpendicular to the display panel, an orthographic projection of the black matrix at least covers an orthographic projection of the second spacers.

9. The display device of claim 1, wherein the color resist layer comprises a plurality of first sub-color resists disposed in the display area, and the infrared transmitting functional area comprises a plurality of second sub-color resists disposed in the infrared light-transmitting area.

10. The display device of claim 9, wherein an arrangement order of the first sub-color resists in the display area and an arrangement order of the second sub-color resists in the infrared light-transmitting area are same.

11. The display device of claim 9, wherein an area of any one of the second sub-color resists in the infrared light-transmitting area is greater than an area of any one of the first sub-color resists in the display area.

12. The display device of claim 11, wherein a width ratio of any one of the second sub-color resists in the infrared light-transmitting area to any one of the first sub-color resists in the display area is M:N; and
   wherein M ranges from 90 μm to 120 μm, and N ranges from 45 μm to 60 μm.

13. A vehicle monitoring device, comprising a display device, wherein the display device comprises a display area and an infrared light-transmitting area disposed adjacent to the display area;
   the display device comprises a display panel, a backlight module, and an infrared sensor disposed on a side of the backlight module away from the display panel and corresponding to the infrared light-transmitting area; and
   the display panel comprises a display functional layer disposed in the display area and an infrared light-transmitting functional layer disposed in the infrared light-transmitting area, the display functional layer comprises a color resist layer disposed in the display area, and a material of the infrared light-transmitting functional layer and a material of the color resist layer are same, the display functional layer further comprises a first photoresist layer disposed on the color resist layer facing toward the side of the backlight module, a second photoresist layer connected to the first photoresist layer is disposed on a side of the infrared light-transmitting functional layer facing toward the side of the backlight module.

14. The vehicle monitoring device of claim 13, wherein the infrared light-transmitting functional layer at least comprises a first sub-color resist layer and a second sub-color resist layer which are stacked, and a color of the first sub-color resist layer and a color of the second sub-color resist layer are different.

15. The vehicle monitoring device of claim 14, wherein the first sub-color resist layer is a blue color resist layer, and a material of the second sub-color resist layer is one of a green color resist layer or a red color resist layer.

16. The vehicle monitoring device of claim 14, wherein the display panel comprises a plurality of black matrixes, and an arrangement density of the black matrixes in the display area is greater than an arrangement density of the black matrixes in the infrared light-transmitting area.

17. The vehicle monitoring device of claim 16, wherein in a direction perpendicular to the display panel, a projection of the black matrixes is located in the display area.

18. The vehicle monitoring device of claim 14, wherein the display functional layer comprises a spacer layer stacked with the color resist layer, and the spacer layer at least comprises a plurality of first spacers disposed in the display area.

19. The vehicle monitoring device of claim 18, wherein the spacer layer comprises a plurality of second spacers disposed in the infrared light-transmitting area, and an arrangement density of the first spacers is greater than an arrangement density of the second spacers.

20. The vehicle monitoring device of claim 19, wherein the display panel comprises a black matrix, and in a direction perpendicular to the display panel, an orthographic projection of the black matrix at least covers an orthographic projection of the second spacers.

\* \* \* \* \*